Patented Jan. 9, 1951

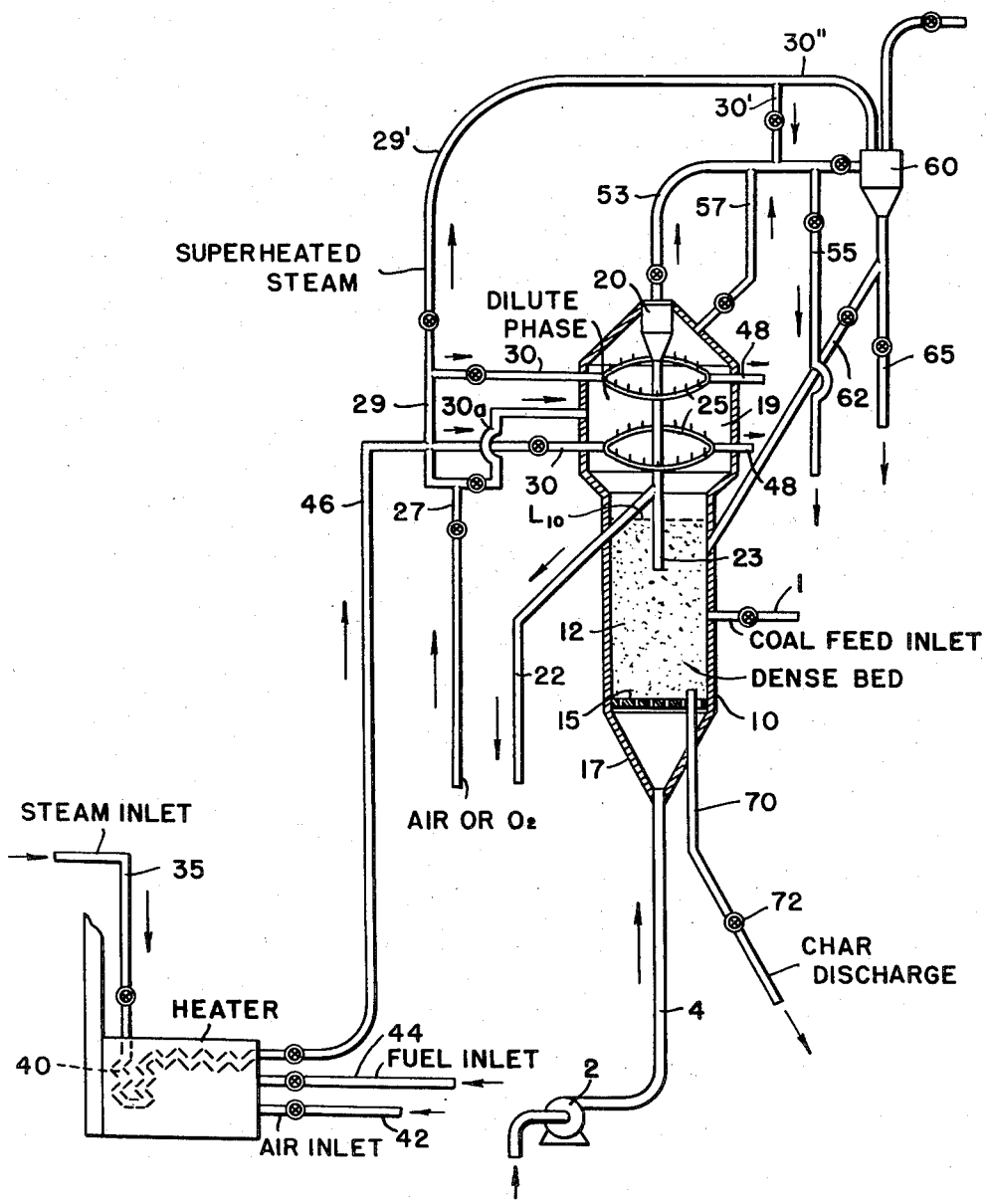

2,537,153

UNITED STATES PATENT OFFICE 2,537,153

FLUIDIZED CARBONIZATION PROCESS

Karl J. Nelson, Cranford, and Homer Z. Martin, Roselle, N. J., assignors to Standard Oil Development Company, a corporation of Delaware Application October 8, 1946, Serial No. 702,020

2 Claims. (Cl. 202—15)

The present invention relates to the carbonization of carbonaceous fuels such as all types of coal, lignites, cellulosic materials including lignin, oil shale, tar sands, as well as heavy oil residues or the like, to produce coke and valuable volatile materials. More particularly the invention is concerned with an improved method and apparatus for the carbonization of these fuels in a dense turbulent bed of finely divided solids fluidized by an upwardly streaming gas.

The application of the so called fluid solids technique to the carbonization of solid carbonizable fuels is well known in the art. In this process finely divided carbonizable solids such as coal, having a fluidizable particle size of say about 50 to 400 mesh are fed to a carbonizer wherein they are maintained at carbonization temperature in the form of a dense turbulent fluidized bed of finely divided solids forming a well defined upper level. The heat required for carbonization may be supplied either by blowing super-heated steam, hot product gas or flue gas upwardly through the bed or by burning a portion of the carbonaceous constituents of the charge with the aid of an oxidizing gas such as air and/or oxygen passed upwardly through the bed or by indirect heat exchange with a suitable heating medium through conventional heat exchange surfaces. The combined action of the gas supplied and the volatile products of the carbonization reaction causes proper fluidization at superficial gas velocities within the carbonizer of about 0.3 to 10 ft. per second.

Volatile products are withdrawn overhead while the coke is recovered from the upwardly flowing vapors and/or from a fluidized solids stream leaving the carbonizer in a downward direction under the pseudo-hydrostatic pressure of the dense fluidized carbonization bed.

The advantages of this procedure over fixed bed operation are great in number and importance. The temperature throughout the carbonization bed is perfectly uniform and may be easily controlled over the wide range of from say 700° to about 2000° F. The yields of tar, light oils, gas and coke are substantially improved and may be readily varied with respect to product qualities and relative product amounts by suitable variations of temperature and/or pressure. The process may be made fully continuous and may be applied to any type of carbonizable charge. There is high flexibility with respect to the type of heating employed. Investment and operating cost is likewise more favorable as compared with fixed bed operation.

However, the smooth continuous operation of "fluid" type carbonizers has been considerably impeded by difficulties arising in connection with the separation of solids fines from the product gases. An efficient gas-solids separation is necessary to avoid carbon losses as well as to facilitate tar recovery. The conventional cyclone type gas-solids separators are located in the top of the carbonization vessel or outside the carbonization vessel ahead of the tar recovery system, and separated solids are recovered or returned to the dense carbonization bed. Serious plugging difficulties are encountered in the operation of systems of this type resulting from the condensation of heavy tar constituents at the rapidly decreasing temperatures prevailing in the dilute phase above the dense phase level and in the cyclone separators. These deposits have to be removed at frequent intervals requiring shut-downs of the plant and preventing continuous runs of commercially desirable length.

The present invention overcomes the aforementioned difficulties and affords various additional advantags as will be fully understood from the following detailed description read with reference to the accompanying drawing.

It is, therefore, the main object of the present invention to provide improved means for carbonizing carbonaceous fuels in a system employing the fluid solids technique.

Another object of this invention is to provide improved means for preventing the plugging of gas-solids separators used in a carbonization system employing the fluid solids technique.

A more specific object of the present invention is to provide means to prevent or substantially reduce the condensation of volatile carbonization products prior to or within the gas-solids separation zone wherein volatile carbonization products are separated from entrained solids fines.

Other and further objects will become apparent from the following disclosure and claims.

We have found that the aforementioned objects and advantages may be accomplished, quite generally, by maintaining the temperature of the dilute solids and gas suspension which is formed above the dense phase level of a fluidized carbonization bed within a carbonization zone, above the condensation temperature of the heaviest volatile carbonization products until the separation of solids from said dilute suspension is substantially completed. Suitable temperatures may approach or even exceed those of the dense carbonization bed. In this manner, condensation ahead of or within the gas-solids separation zone and the consequent plugging of said zone are substantially avoided.

In accordance with one embodiment of the present invention, the additional heat required to maintain the dilute solids and gas suspension withdrawn from the dense carbonization bed at the desired high temperature is supplied by injecting a sufficient quantity of oxidizing gas such as air and/or oxygen into the dilute suspension to permit a limited amount of combustion of entrained solids and/or volatile carbonization products. The oxidizing gas is preferably injected at a plurality of points along the path of the dilute suspension from the dense carbonization bed to the gas-solids separation zone, including the gas-solids separation zone itself. This procedure assures a uniform temperature of the dilute suspension up to the actual separation of solids from vaporous products.

For the purposes of the invention, the quantity of oxidizing gas may be extremely small. Depending on the quantity of dilute phase gases, that is volatile carbonization products, flue gases, water vapor, etc., about 0.1 to 0.5 standard cu. ft. of air per 100 lbs. of coal fed to the carbonizer for each °F. potential drop in temperature due to heat losses between the dense carbonization bed and the separator, or the equivalent amount of oxygen is, in general, adequate to assure good results.

While this embodiment of the invention entails a small loss of products due to the combustion of a limited quantity of volatile carbonization products, it has been found that this loss is negligible as a result of the high reactivity of the entrained solids, causing preferential combustion of the latter.

In accordance with another embodiment of the invention the additional heat required to maintain the dilute suspension above the condensation temperature of volatile carbonization products is supplied in the form of sensible heat of an inert heating gas such as superheated steam, hot make gas, hot flue gases or other hot inert gases injected into the dilute suspension withdrawn from the dense carbonization bed. While this embodiment of the invention requires a separate external heater or furnace to heat the heat-carrying gases to the desired temperatures it has the distinct advantage over the use of a limited combustion within the dilute suspension that no losses of carbonization products by combustion are incurred. The condensation and deposition of volatile carbonization products is prevented by the supply of heat of vaporization and, in addition, by the lowering of the partial pressure of the hydrocarbon vapors produced in the carbonization reaction whereby the heat requirements of the process are substantially reduced.

It will be understood that the amount of heat-carrying gas such as superheated steam required for the purposes of the invention depends on the heat content and temperature of the gas as well as on the temperature required in the dilute suspension, the latter being a function of the carbonization temperature and the heat losses from the equipment carrying the dilute suspension. Quite generally, 0.03–0.2 lb. of steam or other inert gas, superheated to about 1200°–1500° F. per 100 lbs. of coal to be carbonized is sufficient to compensate for each °F. potential drop in temperature of the dilute suspension due to heat losses.

It should be understood that the heat supply in accordance with the aforementioned embodiments of the invention may be modified by providing for an indirect heat exchange between the dilute solids-in-gas suspension and the heat generating combustion and/or the heat-carrying gas, in addition or in place of the direct heat supply. For example, the dilute suspension may be passed around or through coil or jacket means in indirect heat exchange with a combustion reaction or a heat-carrying gas. In this manner, the dilution of the volatile carbonization products with gaseous combustion products or other inert gases may be reduced or entirely avoided.

Having set forth the general nature and objects, the invention will be best understood from the more detailed description hereinafter, in which reference will be made to the accompanying drawing which shows a semi-diagrammatic illustration of a system suitable for carrying out preferred modifications of the present invention.

Referring now in detail to the drawing, the numeral 10 designates a vertical carbonizer vessel designed for fluid solids operation. The gas-solids separation zone in the form of a conventional cyclone separator 20 is arranged in the head of carbonizer 10 and provided with a solids return line 23. A distributing grid 15 separates the substantially cylindrical main section of carbonizer 10 from its lower conical end section 17.

In operation, finely divided carbonizable solids such as a carbonization coal having a particle size between about 10 and 400 mesh, preferably between 50 and 200 mesh, and which may be preheated to about 400°–700° F., is supplied to carbonizer 10 through line 1 by any suitable means known per se such as an aerated standpipe, a pressurized feed hopper, a mechanical conveyor, etc. (not shown). A preheated gas such as superheated steam, hot make or flue gas or an oxidizing gas such as air and/or oxygen is supplied by compressor 2 through line 4 to conical section 17 of carbonizer 10 and enters the latter through grid 15 to heat the finely divided charge to carbonization temperatures which may vary between about 800° and 2000° F. depending on the charge and the products desired. When an oxidizing gas is used, sufficient oxygen is made available to cause a partial combustion which will generate at least a substantial portion of the heat required for carbonization.

The feed rate of solids and the superficial velocity of the gas supplied through line 4 are so controlled that the charge of carbonizer 10 is maintained at carbonization conditions of residence time and temperature in the form of a dense turbulent fluidized solids bed having an upper level $L_{10}$. Solids feed rates of about 5 to 50 lbs. of coal per cu. ft. of carbonizer space per hour in combination with gas velocities of about 0.3–10 ft. per second are generally suitable for this purpose.

Volatile carbonization products and entrained solids pass upwardly from level $L_{10}$ into section or zone 19 of carbonizer 10, which may be of enlarged cross section to allow for the increase in gas volume caused by the gases added as will appear more clearly hereinafter. Even when using the most efficient practically feasible heat insulation for zone 19, the dilute solids-in-gas suspension in section 19 loses heat so rapidly that condensation of heavy volatile carbonization products normally takes place by the time the suspension reaches cyclone separator 20 giving rise to plugging difficulties. Under conventional operating conditions the gases flowing upwardly in the dilute phase tend to cool off because there is no heat liberated in this zone and the heat capacity of the dilute suspension is low compared with the heat loss occurring in even well insulated vessels. It should be noted that the situation in the dilute phase 19 is far different from that in dense phase 12 where considerable heat is continuously liberated and well distributed throughout a well mixed dense turbulent mass of high heat capacity. In order to compensate for these heat losses, heat is supplied to zone 19 by means of a suitable gas injected through one or more gas-distributing devices 25, as will be presently explained.

When it is desired to supply zone 19 with heat generated by the combustion of combustible constituents of the dilute suspension within zone 19 an oxidizing gas such as air and/or oxygen may be supplied from line 27 through line 39a directly into zone 19 or through manifold 29, 30 to gas distributors 25. The amount of oxidizing gas is so chosen that sufficient heat of combustion is generated to maintain the dilute solids-in-gas suspension within zone 19 and separator 20 above the condensation temperature of the heaviest volatile carbonization products at the prevailing conditions of total pressure and partial vapor pressures. If desired, the oxidizing gas may be preheated to about 500°–700° F. prior to its introduction into zone 19, by any conventional means, such as heat exchange with solid and/or volatile carbonization products in a manner known per se.

As indicated above, the heat losses of zone 19 may also be compensated by adding heat in the form of the sensible heat of a heat-carrying gas. This means of heat supply may be preferred for economic and/or design considerations. In this case steam or any other suitable gaseous heat carrier is supplied through line 35 to furnace 40 which receives air and fuel through lines 42 and 44, respectively. The steam or other gas superheated to the desired temperature which may range between about 1000° and about 2000° F. is passed through line 46 to manifold 29, 30 and enters zone 19 through gas distributors 25. The amount of heat-carrying gas is so chosen that substantial condensation within zone 19 or separator 20 is avoided.

When heat supply to zone 19 by indirect heat exchange is desired, one or more of the distributors 25 may have the form of coils provided with gas outlets 48. In this case the branches 30 of manifold 29, leading to such coils 25, may be supplied either with a heat-carrying gas such as steam from line 46 or with a burning combustion mixture of oxidizing gas and fuel introduced through line 27. It will be understoood by those skilled in the art that the means 25 when used as heat transfer means may have any shape suitable and known for heat transfer surfaces such as, coils, tubes, jackets, etc.

Returning now to the flow of the dilute solids-in-gas suspension in zone 19, it enters separator 20 at a temperature safely above condensation temperature and undergoes separation solids and vapors without the deposition of plugging condensate. Separated solids may be recovered through line 22 or returned to the dense carbonization bed through line 23. Vaporous carbonization of products leave separator 20 through line 53 and may be passed through line 55 to a conventional product recovery system (not shown), if desired, after heat exchange with gases and/or solids supplied to the system.

In many instances, particularly when extremely high carbonization temperatures are employed it may be preferable to place the separation zone outside the carbonizer as shown at 60. In this case, the dilute solids-in-gas suspension heated as described above is withdrawn from the top of zone 19 through a line 57 and passed through line 53 to separator 60 provided with solids return line 62 and char recovery line 65. In order to prevent heat losses on the path of the suspension outside carbonizer 10 and in the external separator 60, at least a portion of the gaseous heat-supplying medium from manifold 29, such as gaseous heat carrier, oxidizing gas, or combustion mixture is passed through manifold extensions 29', 30', and 30'' into vapor discharge line 53 and/or separator 60 in amounts sufficient to prevent substantial condensation therein.

The system described above may be operated as an "upflow" unit that is, at superficial gas velocities high enough to permit char recovery exclusively from the dilute suspension through separators 20 and 60 and char recovery lines 22 and 65. However, in many cases it may be desirable to control the height of level $L_{10}$ and/or the residence time of the charge undergoing carbonization without affecting the gas velocities and/or solid feed rates involved. This may be accomplished by providing for a bottom drawoff of carbonized solids from carbonizer 10 through a downflow standpipe 70 or the like, provided with a control valve, such as a slide valve 72.

Instead of supplying the heat required for carbonization by partial internal combustion, a gaseous heat carrier may be used in direct or indirect heat exchange. For example, a hot gas may be passed through suitable tubes located within the dense carbonization bed.

The pressure within carbonizer 10 is preferably atmospheric but may vary from slightly subatmospheric pressure to as high as 400 lbs. per sq. in. depending on the products desired.

The invention will be further illustrated by the following specific examples.

*Example 1*

Suitable operating conditions for the carbonization of Pittsburgh seam coal while avoiding a temperature drop in the dilute phase of a system of the type illustrated in the drawing when air is injected into the dense and dilute phases to supply the heat required therein, are as follows:

| | |
|---|---|
| Coal feed rate | 4200 lbs./hr. |
| Air feed rate to dense bed | 365 SCFM |
| Internal diameter of carbonizer | 5 ft. |
| Height of dilute phase | 15 ft. |
| Dense bed temperature | 900° F. |
| Potential temperature drop in dilute phase | 40° F. |
| Air feed rate to dilute phase | 9 SCFM |
| Material burned in dilute phase | 0.1% by weight of coal charged |
| Temperature of gases leaving dilute phase | 900° F. |

*Example 2*

When in Example 1 superheated steam instead of air is used to prevent a temperature drop in the dilute phase, about 156 lbs. of steam having a temperature of about 1400° F. is injected into the dilute phase in place of the 9 SCFM of air and no combustion takes place in the dilute phase. All other conditions remain unchanged.

While we have referred in the foregoing description chiefly to the carbonization of solid carbonizable material, it should be understood that carbonaceous materials such as oils, oil residues, pitches or asphalts which are liquid at temperatures below the carbonization temperature may be used as starting materials. Such liquid carbonizable materials may be deposited on fluidized solids such as coke, sand or the like maintained in the treating vessel and carbonized on such supports substantially in the manner described above.

The foregoing description and exemplary operations have served to illustrate specific applications and results of the invention. However, other modifications obvious to those skilled in the art are within the scope of the invention. Only such limitations should be imposed on the invention as are indicated in the appended claims.

We claim:

1. A method of carbonizing carbonizable fuels which comprises maintaining a dense fluidized bed of finely divided solids at carbonizing conditions of temperature and pressure, feeding finely divided carbonizable fuel to said bed, passing a gas upwardly through said bed at a rate sufficient to maintain it in a fluidized condition while forming a well defined upper level, removing a dilute suspension of finely divided solids in volatile carbonization products from said upper level, passing said suspension through a gas-solids separation zone and adding by direct heat exchange sufficient heat to said volatile products at a point subsequent to said level in the direction of the gas flow to maintain their temperature above condensation temperature until they have left said separation zone, by burning a portion of the combustible constituents of said dilute suspension in direct heat exchange therewith.

2. The process of claim 1 wherein said heat is added by adding an oxidizing gas selected from the group consisting of air and oxygen to said dilute suspension.

KARL J. NELSON.
HOMER Z. MARTIN.

REFERENCES CITED

The following references are of record in the file of this patent:

UNITED STATES PATENTS

| Number | Name | Date |
|---|---|---|
| Re. 17,181 | McEwen | Jan. 1, 1929 |
| 1,770,020 | Taylor | July 8, 1930 |
| 1,984,380 | Odell | Dec. 18, 1934 |
| 2,098,024 | Bailey | Nov. 2, 1937 |
| 2,432,135 | Barr | Dec. 6, 1937 |
| 2,337,684 | Scheineman | Dec. 28, 1943 |
| 2,339,932 | Kuhl | Jan. 24, 1944 |
| 2,360,787 | Murphree et al. | Oct. 17, 1944 |
| 2,389,399 | Alther | Nov. 20, 1945 |
| 2,414,586 | Egloff | Jan. 21, 1947 |
| 2,420,049 | Martin | May 6, 1947 |

FOREIGN PATENTS

| Number | Country | Date |
|---|---|---|
| 335,740 | Great Britain | Oct. 2, 1930 |